United States Patent [19]
Huntington

[11] Patent Number: 5,852,526
[45] Date of Patent: Dec. 22, 1998

[54] LOW BIAS VOLTAGE WRITE DRIVER USING A LOW BIAS VOLTAGE TO REDUCE THE RISK OF HEAD ARCING

[75] Inventor: Albert M. Huntington, San Jose, Calif.

[73] Assignee: Silicon Systems, Inc., San Jose, Calif.

[21] Appl. No.: 725,581

[22] Filed: Sep. 25, 1996

[51] Int. Cl.⁶ ..................................................... G11B 5/03
[52] U.S. Cl. ............................................... 360/66; 360/46
[58] Field of Search .................................. 360/66, 46, 67, 360/68, 25; 323/312; 327/423, 110

[56] References Cited

U.S. PATENT DOCUMENTS

| | | | |
|---|---|---|---|
| 5,280,196 | 1/1994 | Shinozaki | 360/68 X |
| 5,296,975 | 3/1994 | Contreras et al. | 360/68 X |
| 5,386,328 | 1/1995 | Chiou et al. | 360/68 |
| 5,539,342 | 7/1996 | Gersbach et al. | 327/110 |

*Primary Examiner*—Aristotelis M. Psitos
*Assistant Examiner*—Patrick Wamsley
*Attorney, Agent, or Firm*—W. Daniel Swayze, Jr.; Wade James Brady, III; Richard L. Donaldson

[57] ABSTRACT

A low head bias voltage write driver is described. The present invention comprises a positive supply terminal coupled to a first terminal of a first current source. A first write driver head terminal is coupled to the second terminal of the first current source. A first terminal of a first switch is coupled to the first write driver head terminal. The second terminal of the first switch is coupled to the negative supply terminal. A second current source is coupled to the positive supply terminal. A second write driver head terminal is coupled to the second terminal of the second current source. A first terminal of a second switch is coupled to the second write driver head terminal. The second terminal of the second switch is coupled to the negative supply terminal.

11 Claims, 2 Drawing Sheets

LOW BIAS VOLTAGE WRITE DRIVER USING A LOW BIAS VOLTAGE TO REDUCE THE RISK OF HEAD ARCING

BACKGROUND OF THE INVENTION

1. Field of the Invention

This invention relates to the field of write drivers used to operate inductive recording heads for magnetic recording.

2. Background Art

In disk drives, write driver heads are positioned very close to the magnetic recording disk. The reduced separation between write driver heads and magnetic recording media in high capacity magnetic recording systems has made arcing from write heads to the media a significant limitation on the mean time to failure of write heads. To maximlze performance and write head reliability write heads should be positioned close to the disk while protecting against arcing. To better understand this problem it is important to understand the following background.

Magnetic recording memory systems such as disk drives and tape drives have been a popular means for storing computer generated information for many years. In magnetic disk drives, digital information is typically recorded as bits on concentric tracks on disks comprised of a material capable of maintaining a magnetic field. Each stored digital bit is represented by a region of magnetic particles on the disk. Whether the bit is a 1 or a 0 is indicated by the orientation of the magnetic field on the disk.

In magnetic disk drives the magnetic field is typically generated by a "write head" suspended from an arm over a disk surface. The write head contains an inductive coil capable of producing a localized electromagnetic field with direction and magnitude dependent on electrical current passed through the inductive coil. Data is written on the disk surface by changing the direction that the current flows through the write head. The apparatus used to direct current through the inductive coil of the write head is generally known as a "write driver." The write driver accepts a digital input signal and forces a set current through the write head in a direction determined by the polarity of the digital signal.

FIG. 1 illustrates a conceptual block diagram of one type of typical write driver. One terminal of switch 110 is coupled to the positive supply. A second terminal of switch 110 is coupled to write head terminal $H_{WX}$ and to a first terminal of current source 116. The second terminal of current source 116 is coupled to the negative supply. Similarly, a first terminal of switch 112 is coupled to the positive supply. A second terminal of switch 112 is coupled to write head terminal $H_{WY}$ and to a first terminal of current source 114. The second terminal of current source 114 is coupled to the negative supply.

In operation a control signal, not shown, has two possible states which control the current path in the circuit. In the first state the control signal turns switch 110 and current source 114 on, and turns switch 112 and current source 116 off. In the second state the control signal turns switch 112 and current source 116 on and turns switch 110 and current source 114 off. Therefore, in one operative state current flows through switch 110 through the write head connecting $H_{WX}$ and $H_{WY}$ to current source 114 and the negative supply. In a second operative state current flows through switch 112 through the write head connecting $H_{WX}$ and $H_{WY}$ to current source 116 and the negative supply. These two operative states define the magnetic field orientation corresponding to a single bit on a magnetic recording medium.

FIG. 2 illustrates a conceptual block diagram of a second typical write driver configuration. FIG. 2 is similar to FIG. 1 with switches 214 and 216 replacing current sources 114 and 116 and adding current source 218 in series with the negative supply.

FIG. 3 illustrates the write head bias voltage over several switching cycles of a typical prior art write head, including, for example, the write drivers illustrated in FIGS. 1 and 2. The solid line in FIG. 3 represents the voltage on the $H_{WX}$ side of the write head. The dashed line represents the voltage on the $H_{WY}$ side of the write head. The large transient voltages occur when the direction of the current flowing through the write head is switched. The steady state bias voltage for both the sides of the write head is over 9 V. This high bias voltage creates reliability problems for the write head. For example, the high bias voltage increases the likelihood of electrical discharge between, the write head and the media. This type of electrical discharge can damage the write head, particularly where it occurs frequently.

U.S. Pat. No. 5,386,328 granted to Chiou et al., issued Jan. 31, 1995, and assigned to the assignee of the present invention describes a two-therminal inductive head write driver having a head voltage that swings between the upper and lower supply voltage rails. A write driver with a rail to rail voltage swing can be susceptible to arcing from the write head to the recording medium, with an increased likelihood of arcing when the write head is near the positive supply rail.

Thus an improved write driver is required to improve the reliability of magnetic recording systems by reducing arcing from write heads to recording media.

SUMMARY OF THE INVENTION

The present invention provides an improved write driver for inductive recording heads, used in for example disk drives. The present invention comprises a positive supply terminal coupled to a first terminal of a first current source. A first write driver head terminal is coupled to the second terminal of the first current source. A first terminal of a first switch is coupled to the first write driver head terminal. The second terminal of the first switch is coupled to the negative supply terminal.

A second current source is coupled to the positive supply terminal. A second write driver head terminal is coupled to the second terminal of the second current source. A first terminal of a second switch is coupled to the second write driver head terminal. The second terminal of the second switch is coupled to the negative supply terminal.

This write driver configuration can provide a write driver head bias voltage near the negative supply, for example, under 2 V using a 12 V positive supply. The low hear bias voltage reduces the risk of electrical discharge from the head to the recording medium.

DETAILED DESCRIPTION OF THE INVENTION

The present invention is directed to a low head bias voltage write driver. In the following description, numerous specific details are set forth to provide a more thorough understanding of the present invention. It will be apparent, however, to one skilled in the art, that the present invention may be practiced without these specific details. In other instances, well-known features have not been described in detail so as not to unnecessarily obscure the present invention.

The present invention provides an improved write driver circuit configuration with a write driver head bias voltage near the negative supply, for example, under 2 V using a 12 V positive supply. The low head bias voltage reduces the risk of electrical discharge from the head to the recording medium. The present invention applies generally to the field of magnetic recording. Specific applications of the present invention include, for example, computer disk drives, digital audio tape recording systems, and computer tape cartridge systems.

Figure 1:
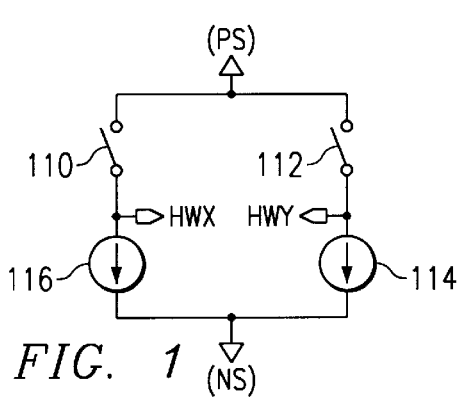
FIG. 1 illustrates a conceptual block diagram of one type of typical write driver.
Figure 2:
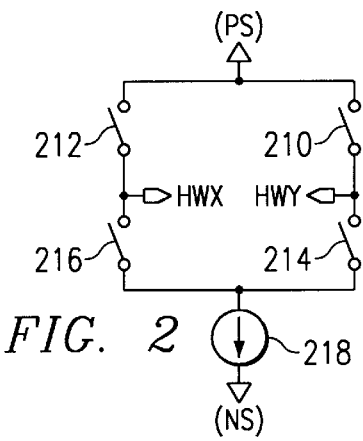
FIG. 2 illustrates a conceptual block diagram of a second typical write driver configuration.
Figure 3:
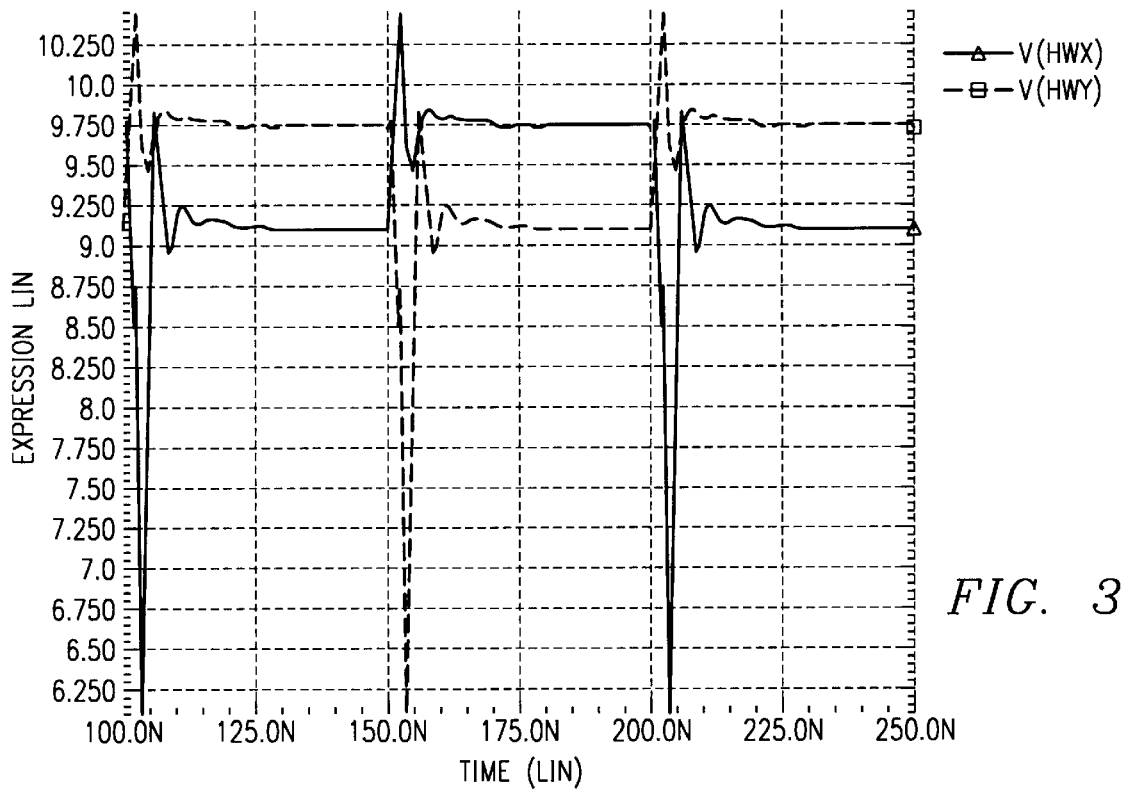
FIG. 3 illustrates the write head bias voltage over several switching cycles of a typical prior art write head.
Figure 4:
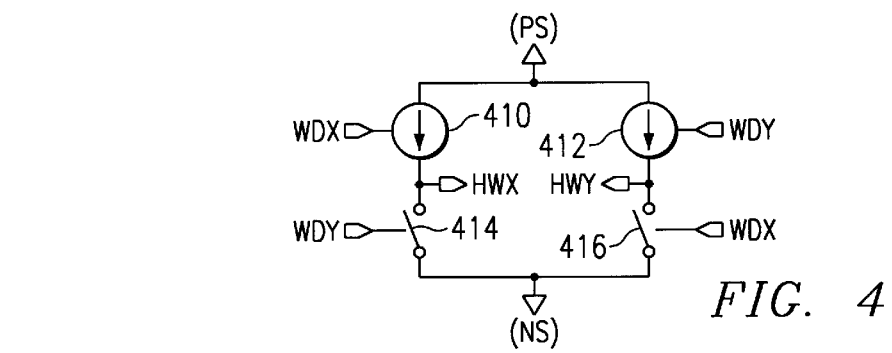
FIG. 4 illustrates a conceptual block diagram of one embodiment of the present invention.

FIG. 4 illustrates a conceptual block diagram of one embodiment of the present invention. A first terminal of current source 410 is coupled to the positive supply PS. A second terminal, of current source 410 is coupled to write head terminal $H_{WX}$ and to a first terminal of switch 414. A second terminal of switch 414 is coupled to the negative supply NS. A first terminal of current source 412 is coupled to the positive supply. A second terminal of current source 412 is coupled to write head terminal $H_{WY}$ and to a first terminal of switch 416. A second terminal of switch 416 is coupled to the negative supply. Write driver control signal $W_{DX}$ is coupled to current source 410 and switch 416. Write driver control signal $W_{DY}$ is coupled to current source 412 and switch 414.

In operation, when $W_{DX}$ is high and $W_{DY}$ is low current source 410 is on, switch 416 is closed, current source 412 is off and switch 414 is open. Hence current flows from the positive supply through current source 410 to $H_{WX}$ across the inductive head to $H_{WY}$ through switch 416 to the negative supply. When $W_{DX}$ is low and $W_{DY}$ is high current source 412 is on, switch 414 is closed, current source 410 is off and switch 416 is open. Hence current flows from the positive supply through current source 412 to $H_{WY}$ across the inductive head to $H_{WX}$ through switch 414 to the negative supply. These two operative states are used to define the magnetic field orientation of regions on magnetic recording media and thereby to store digital data.

Coupling the write head terminals $H_{WX}$ and $H_{WY}$ to the negative supply through a switch instead of through a current source enables the bias voltage of the write head to be reduced. Reducing the head bias voltage reduces the risk of the head discharging electrical current into the recording medium, and thereby reduces the risk of damage to the head.

Figure 5:
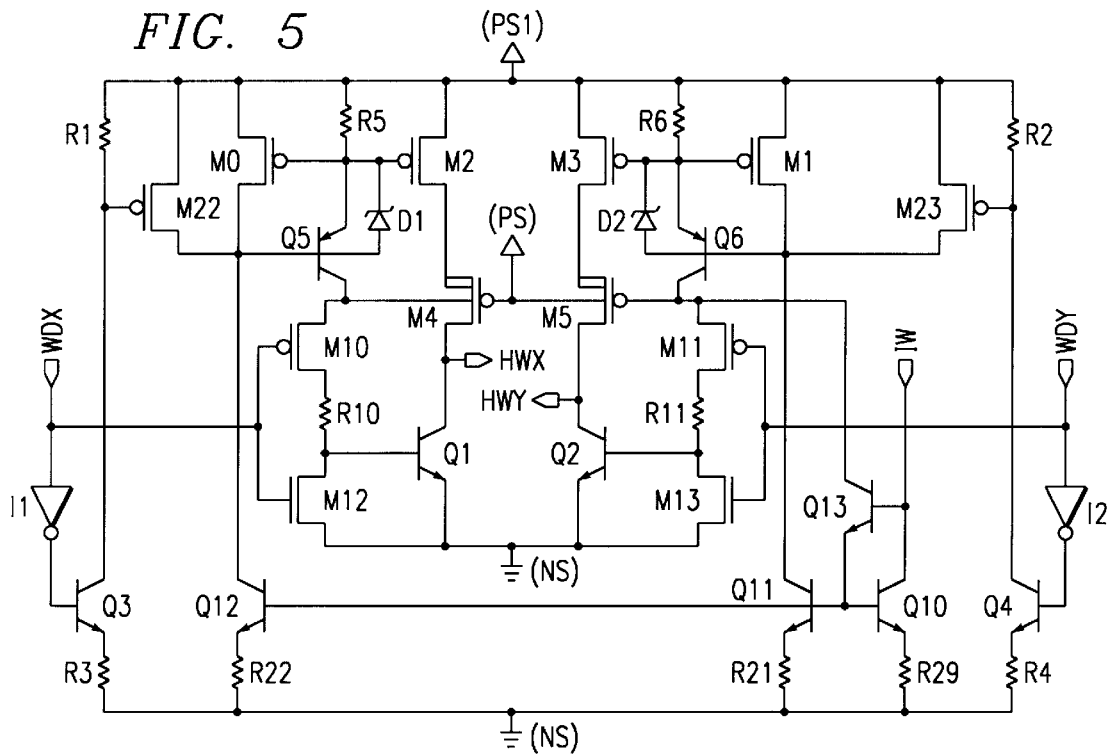
FIG. 5 illustrates one embodiment of the low bias voltage write driver of the present invention.

FIG. 5 illustrates one embodiment of the low bias voltage write driver of the present invention. Write driver input $W_{DY}$ is coupled to the input of inverter I2. The output of inverter I2 is coupled to the base of NPN transistor Q4. The collector of transistor Q4 is coupled to the gate of PMOS FET M23 and to a first terminal of resistor R2. The emitter of transistor Q4 is coupled to the negative supply through resistor R4. The second terminal of resistor R2 is coupled to positive supply PS1. The source of FETs M23 and M1 are coupled to positive supply PS1. The drain of FET M23 is coupled to the drain of PMOS FET M1, the base of PNP transistor Q6, and the input of Schottky diode D2.

PMOS FETs M1 and M3, and NPN transistors Q10, Q11 and Q13 are part a current mirror which defines the current that flows through the inductive head across terminals $H_{WX}$ and $H_{WY}$. PMOS FET M23 is a switch which controls the M1–M3 current source. PNP transistor Q6 decreases the turn on time of the M1–M3 current source. Current mirror input IW is coupled to the base of transistor Q13 and the collector of transistor Q10. The emitter of transistor Q13 is coupled to the base of transistors Q10 and Q11. The emitter of transistor Q10 is coupled to the negative supply through resistor R29. The emitter of transistor Q11 is coupled to the negative supply through resistor R21. The collector of transistor Q11 is coupled to the drain of FET M1. The output of Schottky diode D2 is coupled to the gates of PMOS FETs M1 and M3, as well as a first terminal of resistor R6. The second terminal of resistor R6 is coupled to PS1.

PMOS FET M11 and NMOS FET M13 form a type of inverter. The source of FET M11 is coupled to the emitter of transistor Q6. The gates of FETs M11 and M13 are coupled to input $W_{DY}$. The drain of FET M11 is coupled to a first terminal of resistor R11. The second terminal of resistor R11 is coupled to the source of FET M13.

Schottky NPN transistor Q2 forms a lower switch which directs the current through the inductive head across terminals $H_{WX}$ and $H_{WY}$. The base of transistor Q2 is coupled to the source of FET M13. The emitter of transistor Q2 is coupled to the negative supply. The collector of transistor Q2 is coupled to the drain of PMOS FET M5 and the inductive head across terminals $H_{WX}$ and $H_{WY}$. The source of FET M5 is coupled to the drain of FET M3. The gate of FET M5 is coupled to positive supply PS and the collector of transistor Q13. The body terminal of FET M5 is coupled to the source of M5.

The left half of the circuit of FIG. 5 is essentially a mirror image of the right half described above. Write driver input $W_{DX}$ is coupled to the input inverter I1. The output of inverter I1 is coupled to the base of NPN transistor Q3. The collector of transistor Q3 is coupled to the gate of PMOS FET M22 and to positive supply PS1 through resistor R1. The emitter of Q3 is coupled to the negative supply through resistor R3. The sources of FETs M22 and M0 are coupled to PS1. The drain of FET M22 is coupled to the drain of PMOS FET M0, the base of PNP transistor Q5, and the input of Schottky diode D1.

PMOS FETs M0 and M2 and NPN transistors Q10–Q13 form part of a current mirror which defines the current that flows through the inductive head across terminals $H_{WX}$ and $H_{WY}$. PMOS FET M22 is a switch which controls the M0–M2 current source. PNP transistor Q5 decreases the turn on time of the M0–M2 current source. The base of transistor Q12 is coupled to the bases of transistors Q10 and Q11. The emitter of Q12 is coupled to the negative supply through resistor R22. The collector of Q12 is coupled to the drain of FET M0. The output of Schottky diode D1 is coupled to the gates of PMOS FETs M0 and M2, as well as to PS1 through resistor R5.

PMOS FET M10 and NMOS FET M12 form a type of inverter. The source of FET M10 is coupled to the emitter of transistor Q5. The gates of FETs M10 and M12 are coupled to input $W_{DX}$. The drain of FET M10 is coupled to the source of FET M12 through resistor R19. The drain of FET M12 is coupled to the negative supply. In this embodiment $W_{DX}$ and $W_{DY}$ are CMOS control signals. Other embodiments of the present invention can be made using non-CMOS control signals, for example, Emitter Coupled Logic ("ECL") level control signals.

Schottky NPN transistor Q1 forms a lower switch which directs the current through the inductive head across terminals $H_{WX}$ and $H_{WY}$. The base of transistor Q1 is coupled to the source of FET M12. The emitter of transistor Q1 is coupled to the negative supply. The collector of transistor Q1 is coupled to the inductive head across terminals $H_{WX}$ and $H_{WY}$, and the drain of PMOS FET M4. The source of FET M4 is coupled to the drain of FET M2. The gate of FET M4 is coupled to the positive supply PS and to the source of FET M10. The body terminal of FET M4 is coupled to the source of M4.

There are two primary write operations for the circuit, the first is to drive current from M2 through M4 to the write head across terminals $H_{WX}$ and $H_{WY}$ through Q2 to the negative supply. The other write operation is to drive current from M3 through M5 through the write head across terminals $H_{WX}$ and $H_{WY}$ and through Q1 to the negative supply. In operation, when write driver input $W_{DX}$ is high and $W_{DY}$ is low, inverter I1 inverts the high $W_{DX}$ signal thereby turning transistor Q3 off. Q3 being off causes there to be a high voltage at the gate of PMOS FET M22 thereby turning M22 off. With M22 off current drawn through the current mirror including Q12 lowers the voltage at the base of PNP transistor Q5 turning Q5 on and lowers the voltage at the gates of M0 and M2, turning M0 and M2 on.

On the other side of the circuit inverter I2 inverts the $W_{DY}$ low signal to turn on transistor Q4. Q4 being on lowers the voltage at the gate of PMOS FET M23 turning M23 on. This raises the voltage at the gate of Q6 turning Q6 off and forces current through diode D2, raising the voltage at the gates of PMOS FETs M1 and M3 which turns M1 and M3 off.

With regard to the switch section of the circuit, the inverter formed by M10 and M12 inverts the $W_{DX}$ high signal. This turns Schottky NPN transistor Q1 off. The inverter formed by M11 and M13 inverts the $W_{DY}$ low signal, which turns Schottky NPN transistor Q2 on. Therefore, with $W_{DX}$ high and $W_{DY}$ low current flows through M2 through M4 to the write head to Q2 and to the negative supply.

Similarly, where $W_{DX}$ is low and $W_{DY}$ is high current flows from M3 through M5 through the write head to Q1 and to the negative supply. Switching the current between these two paths causes the write head to change the magnetic field orientation for a bit on a magnetic recording medium, for example, a computer hard disc platter.

Figure 6:
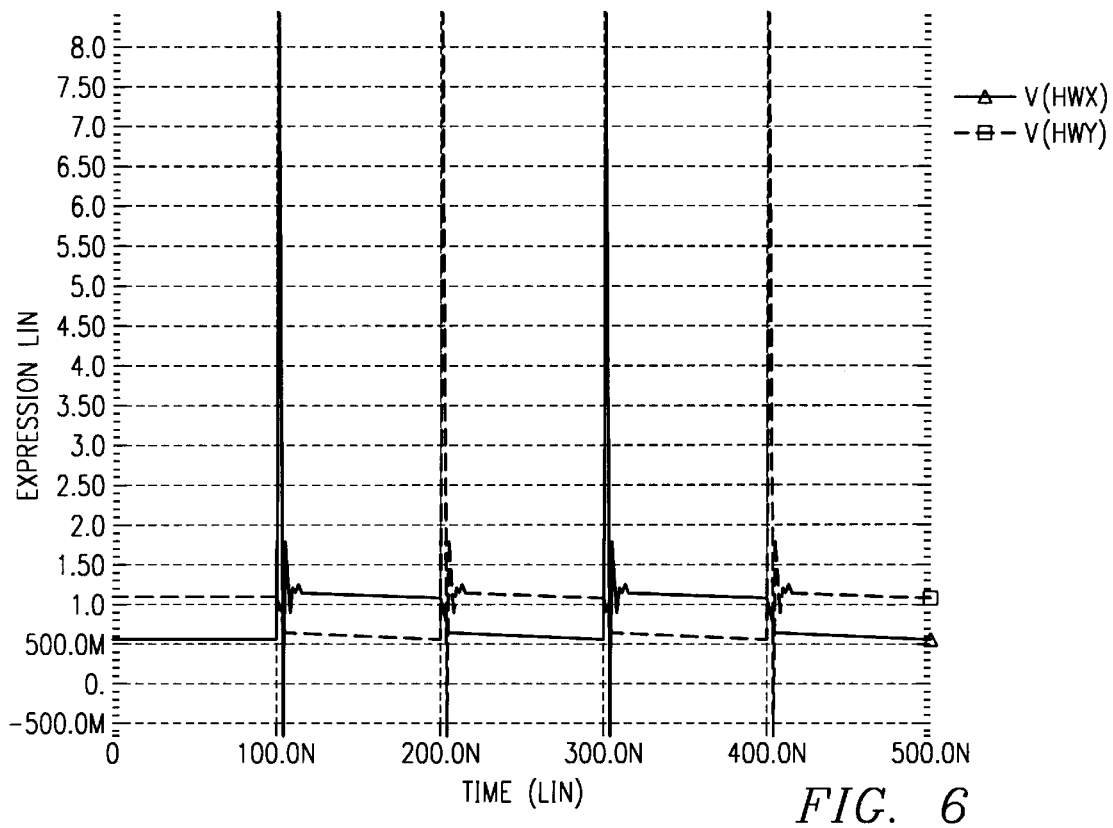
FIG. 6 illustrates head bias voltages during several switching cycles of one embodiment of the present invention.

The head bias voltages during several switching cycles of one embodiment of the present invention is illustrated in FIG. 6. The solid line in FIG. 6 represents the voltage at the $H_{WX}$ side of the write head. The dashed line represents the voltage at tone $H_{WY}$ side of the write head. As shown in FIG. 6 during steady state operation the bias voltage at both sides of the write lead is well under 1.5 V. The transient high voltage swings occur when the current direction through the write head is switched. The low steady state head bias voltage of the present invention improves the reliability and durability of write heads by reducing the arcing between the behead and the recording medium.

Typically write driver circuits use NPN transistor current sources to drive current through the write head because NPN transistors have a stronger driving ability. In one embodiment of the present invention, illustrated in FIG. 5, PMOS FET current sources, including M2–M5, drive current through the write head. These PAIVOS FETs are made relatively large so as to provide the high currents required to rapidly switch the direction of current through the head and to induce a sufficient magnetic field to define a bit in the magnetic recording medium. The increase in the size of the PMOS FETs increases the gate capacitance of the FETs and thus their turn on time for a given control current.

PNP helper transistors Q5 and Q6 and diodes D1 and D2 increase the switching speed of the FETs. When the write driver control signal $W_{DY}$ goes high inverter I2 provides a low signal to Q4 turning Q4 off. Q4 being off raises the voltage at the gate of PMOS FET M23 turning M23 off. Q11 is part of a current mirror which draws current out of the base of PNP transistor Q6 turning Q6 on. Diode D2 isolates the relatively large gate capacitances of M1 and M3 because D2 is reversed biased when the voltage at the base of Q6 is lower than the voltage at the gates of M1 and M3. Isolating the M1 and M3 gate capacitances increases the switching speed of Q6. Q6 being on draws current out of the M1 and M3 gates thereby turning M1 and M3 on. Thus PNP transistors Q5 and Q6 and diodes D1 and D2 increase the switching speed of the PMOS FET drivers M2 and M3 and compensate for the larger size of these PMOS FETs.

The present invention may be implemented in a variety of circuit configurations. For example, in one embodiment write driver current sources comprised of M2, M3, M4 and M5 are replaced by PNP transistor current sources an another embodiment the switches formed by Q1 and Q2 are replaced by NMOS FET switches.

Thus a low head bias voltage write driver has been described. Although the present invention has been described with respect to certain specific embodiments, it will be clear to those skilled in the art that the inventive features of the present invention are applicable to other embodiments as well, all of which are intended to fall within the scope of the present invention.

I claim:

1. A write driver circuit comprising:

a negative supply terminal, a positive supply terminal;

a first current source, said first current source being coupled to said positive supply terminal;

a first write driver head terminal to connect a first write driver, said first write driver head terminal being directly coupled to said first current source while said first write driver head is active;

a second current source, said second current source coupled to said positive supply terminal;

a second write driver head terminal to connect a second write driver, said second write driver head terminal being directly coupled to said second current source while said second write driver head is active;

a first switch, a first terminal of said first switch being coupled to first write driver head terminal;

a second switch, a first terminal of said second switch being coupled to said second write driver head terminal;

second terminals of said first and second switches being coupled to said negative supply terminal so that the bias voltage of said first and second write head terminals is closer to said negative supply terminal voltage than said positive supply terminal voltage.

2. The write driver circuit of claim 1 wherein said first current source is a switched current source; and wherein said second current source is a switched current source.

3. The write driver circuit of claim 2 further comprising:

a first current source switch driver transistor, said first current source switch driver transistor coupled to said first current source so as to decrease the switching time of said first current source;

a second current source switch driver transistor, said second current source switch driver transistor coupled to said second current source so as to decrease the switching time of said second current source.

4. The write driver circuit of claim 3 further comprising:

first and second isolation diodes, said isolation diodes each having a first and second terminal;

said first isolation diode first terminal coupled to said first current source, said first isolation diode second terminal coupled to said first current source switch driver transistor; said said second isolation diode first terminal coupled to said second current source, said second: isolation diode second terminal coupled to said second current source switch driver transistor.

5. The write driver circuit of claim 4 wherein the bias voltage of said first and second write head terminals is less than 2 V.

6. The write driver circuit of claim 5 wherein said first and second switches are coupled directly to said negative supply terminal.

7. The write driver circuit of claim 6 wherein said write driver circuit drives a disk drive inductive write head.

8. The write driver circuit of claim 7 wherein said first and second switches are controlled by CMOS level input signals.

9. The write driver circuit of claim 3 wherein said first and second current sources are comprised of PMOS FETs.

10. The write driver circuit of claim 9 wherein said first current source switch driver transistor comprises a PNP transistor; and wherein said second current source switch driver transistor comprises a PNP transistor.

11. The write driver circuit of claim 3 wherein said first and second switches are comprised of Schottky NPN transistors.

* * * * *